United States Patent
Nakano et al.

(10) Patent No.: US 10,033,089 B2
(45) Date of Patent: Jul. 24, 2018

(54) ANTENNA DEVICE AND ELECTRONIC APPARATUS INCLUDING ANTENNA DEVICE

(71) Applicant: Murata Manufacturing Co., Ltd., Nagaokakyo-shi, Kyoto-fu (JP)

(72) Inventors: Shinichi Nakano, Nagaokakyo (JP); Masahiro Ozawa, Nagaokakyo (JP); Nobuhito Tsubaki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/843,105

(22) Filed: Dec. 15, 2017

(65) Prior Publication Data

US 2018/0123223 A1    May 3, 2018

Related U.S. Application Data

(63) Continuation of application No. 15/257,982, filed on Sep. 7, 2016, now Pat. No. 9,876,275, which is a
(Continued)

(30) Foreign Application Priority Data

Sep. 26, 2012    (JP) .................................. 2012-211709
Jul. 5, 2013      (JP) .................................. 2013-141969

(51) Int. Cl.
*H01Q 1/24* (2006.01)
*H01Q 1/50* (2006.01)
*H04B 5/00* (2006.01)
*H01Q 13/10* (2006.01)
*H01Q 1/36* (2006.01)
*H04M 1/02* (2006.01)

(52) U.S. Cl.
CPC ............. *H01Q 1/243* (2013.01); *H01Q 1/241* (2013.01); *H01Q 1/36* (2013.01); *H01Q 1/50* (2013.01); *H01Q 13/10* (2013.01); *H04B 5/0031* (2013.01); *H04M 1/0202* (2013.01)

(58) Field of Classification Search
CPC .......... H01Q 1/241; H01Q 1/243; H01Q 1/36; H01Q 1/50; H01Q 13/10
See application file for complete search history.

(56) References Cited

U.S. PATENT DOCUMENTS

2012/0091821 A1*    4/2012   Kato ........................ H01Q 1/38
                                                          307/104

FOREIGN PATENT DOCUMENTS

JP         2011249935 A    * 12/2011   ............... H01Q 7/04

OTHER PUBLICATIONS

Nakano et al., "Antenna Device and Electronic Apparatus Including Antenna Device", U.S. Appl. No. 15/251,982, filed Sep. 7, 2016.

* cited by examiner

*Primary Examiner* — Hoang Nguyen
(74) *Attorney, Agent, or Firm* — Keating & Bennett, LLP

(57) ABSTRACT

An antenna device includes a casing including a metal casing portion and a feed coil. The metal casing portion includes a main surface, a side surface connected to the main surfaces, and a notch portion located in the side surface. The feed coil is disposed inside the casing to be coupled with the metal casing portion by a magnetic field, and includes a winding central portion forming a coil opening portion. The feed coil is disposed near the notch portion, with the coil opening portion directed to a region including the notch portion.

4 Claims, 16 Drawing Sheets

Related U.S. Application Data continuation of application No. 14/278,080, filed on May 15, 2014, now Pat. No. 9,466,871, which is a continuation of application No. PCT/JP2013/074477, filed on Sep. 11, 2013.

ANTENNA DEVICE AND ELECTRONIC APPARATUS INCLUDING ANTENNA DEVICE

BACKGROUND OF THE INVENTION

1. Field of the Invention

The present invention relates to an antenna device including a metal casing as an antenna and an electronic apparatus including the same.

2. Description of the Related Art

In recent years, a casing made of a metal such as aluminum or magnesium has sometimes been used in a mobile communication terminal such as a cellular phone terminal to improve the exterior design and maintain the strength of the casing, which is becoming larger and thinner.

If an electronic apparatus including an antenna has a metal casing, electromagnetic waves transmitted or received by the antenna are subject to the influence of, for example, reflection and absorption by the metal casing. When mounting the antenna in or on the electronic apparatus including the metal casing, therefore, the configuration, disposition, and so forth of the antenna need to be elaborated. For example, in an HF-band communication system such as NFC (Near Field Communication), simply disposing a coil antenna inside a metal casing does not enable communication with a communication partner.

Meanwhile, antenna devices using a metal casing as an antenna include the one described in International Publication No. 2010/122685. The antenna described in International Publication No. 2010/122685 includes a metal casing portion and a feed coil. A main surface of the metal casing portion is formed with an opening portion and a slit portion. A coil opening portion of the feed coil and the opening portion of the metal casing portion overlap, as viewed in the direction perpendicular to the main surface.

With this configuration, when a current flows through the feed coil, an induced current flows around the metal casing portion. Further, a magnetic field passes through the opening portion and circulates to surround the metal casing portion. Therefore, the magnetic field widely spreads around the metal casing portion, allowing the metal casing portion to function as a part of the antenna.

In the antenna device described in International Publication No. 2010/122685, it is necessary to form the opening portion and the slit portion in the main surface of the metal casing portion. However, the shape and so forth and the main surface of the electronic apparatus have significant influence on the design of the electronic apparatus. The above-described antenna device, therefore, may limit the degree of design freedom of the electronic apparatus including the antenna device and compromise the design. Further, if the opening portion and the slit portion are formed in the main surface of the metal casing portion, the strength of the casing is substantially reduced. According to the above-described antenna device, therefore, a casing having sufficient strength may not be obtained.

SUMMARY OF THE INVENTION

Preferred embodiments of the present invention provide an antenna device that provides increased strength of a casing of an electronic apparatus without limiting the degree of design freedom of the electronic apparatus and an electronic apparatus including the same.

An antenna device according to a preferred embodiment of the present invention includes a casing including a metal casing portion and a feed coil. The metal casing portion includes a main surface, a side surface connected to the main surface, and a notch portion provided in the side surface. The feed coil is disposed inside the casing to be coupled with the metal casing portion by a magnetic field, and includes a winding central portion defining a coil opening portion. The feed coil is disposed near the notch portion, with the coil opening portion directed to a region including the notch portion.

In this configuration, when a current flows through the feed coil, an induced current flows through the metal casing portion coupled by the magnetic field. The induced current travels around the notch portion, and flows around the metal casing portion due to the edge effect. Then, a magnetic field is generated by the current flowing through the feed coil and the induced current flowing through the metal casing portion. The magnetic field passes through the coil opening portion and the notch portion, and circulates to surround the metal casing portion. Therefore, the magnetic field widely spreads around the metal casing portion. It is thus possible to cause the metal casing portion to function as an antenna.

Further, in general, the shape and so forth of a main surface of an electronic apparatus have significant influence on the design of the electronic apparatus. In this configuration, there is no need to form the notch portion in the main surface of the electronic apparatus including the antenna device. Therefore, the degree of design freedom of the electronic apparatus is not limited, and the design is not compromised. Further, in this configuration, even if the notch portion is provided in the metal casing portion, the strength of the casing of the electronic apparatus is not significantly reduced. Accordingly, it is possible to maintain a desired or sufficient strength of the casing of the electronic apparatus.

In the antenna device according to a preferred embodiment of the present invention, the opening portion may extend to the main surface of the metal casing portion. In this configuration, the magnetic field generated around the metal casing portion widely spreads in the direction in which the main surface of the metal casing portion is oriented. Even if high-frequency power supplied to the feed coil is small, therefore, it is possible to increase the communication distance of the antenna device not only in the direction in which the side surface of the metal casing portion is oriented but also in the direction in which the main surface of the metal casing portion is oriented.

In the antenna device according to a preferred embodiment of the present invention, the feed coil may include a portion located near the main surface of the metal casing portion. In this configuration, even if the high-frequency power supplied to the feed coil is small, the distribution of the induced current generated in the metal casing portion spreads to a region of the main surface of the metal casing portion distant from the notch portion. Further, the magnetic field generated around the metal casing portion widely spreads in the direction in which the main surface of the metal casing portion is oriented. Accordingly, the direction of directivity of the antenna shifts from the direction in which the side surface of the metal casing portion is oriented toward the direction in which the main surface of the metal casing portion is oriented, thus allowing communication using the main surface of the metal casing portion.

According to various preferred embodiments of the present invention, it is possible to use a metal casing portion as a part of an antenna while maintaining the strength of a casing of an electronic apparatus without limiting the degree of design freedom of the electronic apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
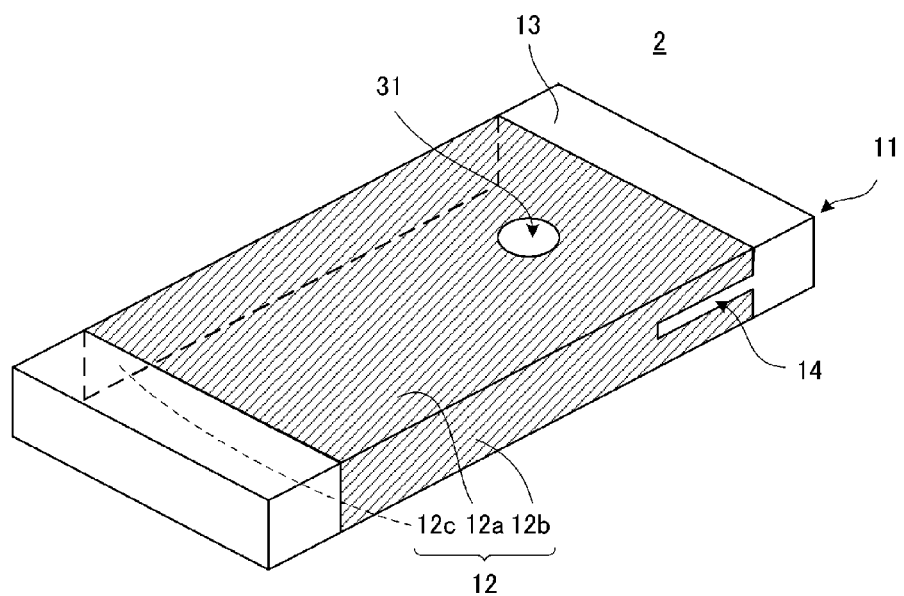
FIG. 1A is an external perspective view of an electronic apparatus including an antenna device according to a first preferred embodiment of the present invention, as viewed from a rear surface side thereof.
Figure 1B:
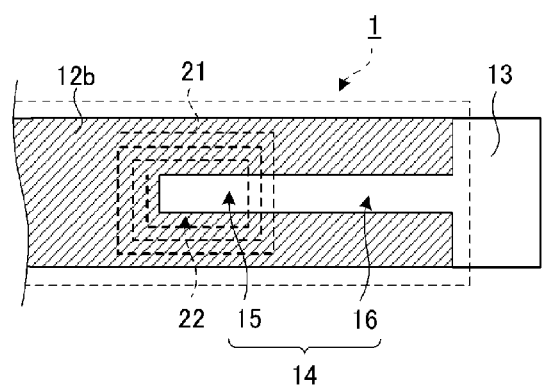
FIG. 1B is a partial side view thereof.
Figure 2:
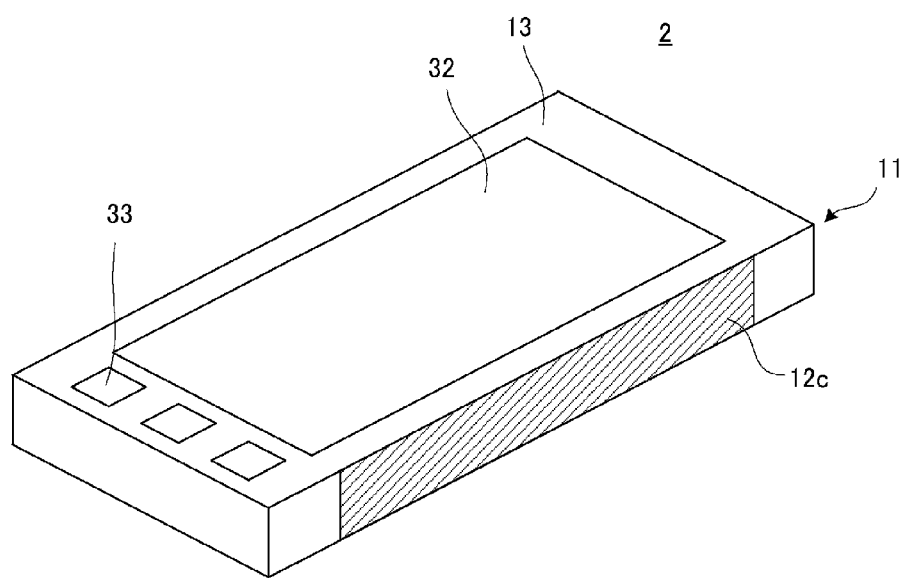
FIG. 2 is an external perspective view of the electronic apparatus including the antenna device according to the first preferred embodiment of the present invention, as viewed from an operation surface side thereof.

An antenna device according to a first preferred embodiment of the present invention will be described. FIG. 1A is an external perspective view of an electronic apparatus including the antenna device according to the first preferred embodiment, as viewed from a rear surface side thereof, and FIG. 1B is a partial side view thereof. FIG. 2 is an external perspective view of the electronic apparatus, as viewed from a side thereof having a display unit and an operation unit. In the following description, a surface having a large area included in outer surfaces of the electronic apparatus will be referred to as a main surface, and a surface substantially perpendicular to the main surface will be referred to as a side surface.

An antenna device 1 is a magnetic field radiation antenna that includes a casing 11 and a feed coil 21, transmits a transmission signal from the feed coil 21 by using the casing 11 as a radiator, and/or receives a reception signal from a communication partner at the feed coil 21 via the casing 11. The casing 11 is the body itself of the electronic apparatus, and is defined by a metal casing portion 12 made of a metal and a resin casing portion 13 made of a resin. The antenna device 1 is preferably for use in an HF-band communication system such as NFC, for example. In NFC, the antenna device 1 is preferably used in reader/writer mode or peer-to-peer mode, for example. An electronic apparatus 2 including the antenna device 1 has an outer shape that preferably is a rectangular or substantially rectangular parallelepiped. The electronic apparatus 2 preferably is a mobile communication terminal such as a cellular phone terminal or a tablet terminal, for example.

The metal casing portion 12 preferably includes a main surface metal portion 12a and side surface metal portions 12b and 12c. The metal casing portion 12 is disposed to cover most of the casing 11 including a central portion thereof, except for the resin casing portion 13 covering electric field radiation antennas (not illustrated) disposed on both ends in the long direction of the casing 11. The main surface metal portion 12a, the side surface metal portion 12b, and the side surface metal portion 12c are disposed on a first main surface, a first side surface, and a second side surface of the electronic apparatus 2, respectively. The side surface metal portions 12b and 12c are connected to the main surface metal portion 12a. The resin casing portion 13 occupies the other portions of the casing 11.

An opening 31 is provided in the main surface metal portion 12a at the position of a camera lens. A display unit 32 and an operation unit 33 of the electronic apparatus 2 are disposed on a second main surface (a main surface opposite to the first main surface).

A notch portion 14 is provided in the side surface metal portion 12b. The notch portion 14 is configured to communicate with a side of outer edges of the side surface metal portion 12b perpendicular or substantially perpendicular to the first main surface. The notch portion 14 preferably includes an opening portion 15 and a slit portion 16. The slit portion 16 connects the opening portion 15 and the outer edge of the side surface metal portion 12b. In this example, the width of the opening portion 15 is preferably the same or substantially the same as the width of the slit portion 16.

The feed coil 21 is disposed inside the casing 11 near the side surface metal portion 12b. The feed coil 21 is a spiral conductor including a winding central portion defining a coil opening portion 22. The coil opening portion 22 overlaps the opening portion 15, as viewed in the direction perpendicular to the first side surface. The feed coil 21 is coupled with the metal casing portion 12 by a magnetic field. A not-illustrated circuit board is mounted inside the casing 11. A feed circuit connected to the feed coil 21 is provided on the circuit board.

Figure 3A:
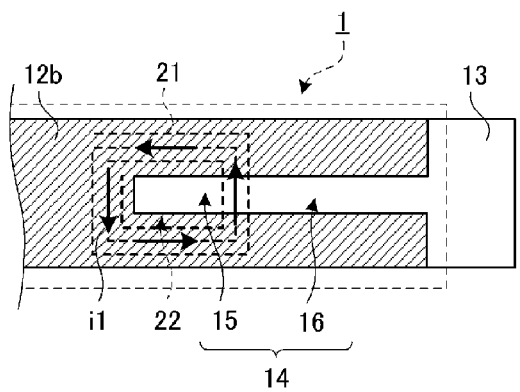
FIG. 3A is a diagram illustrating a current flowing through a feed coil 21.
Figure 3B:
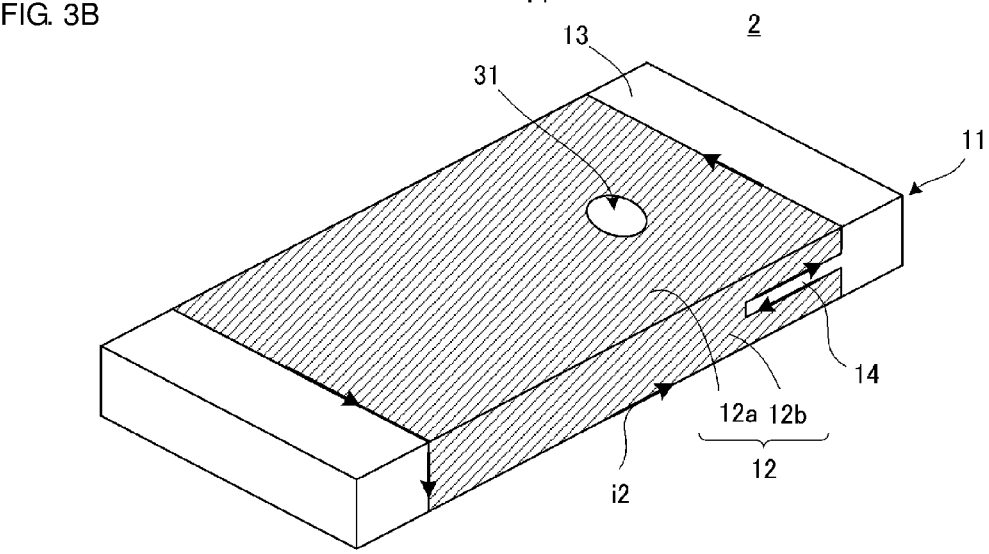
FIG. 3B is a diagram illustrating an induced current flowing through a metal casing portion 12 in a case in which the induced current is large.
Figure 3C:
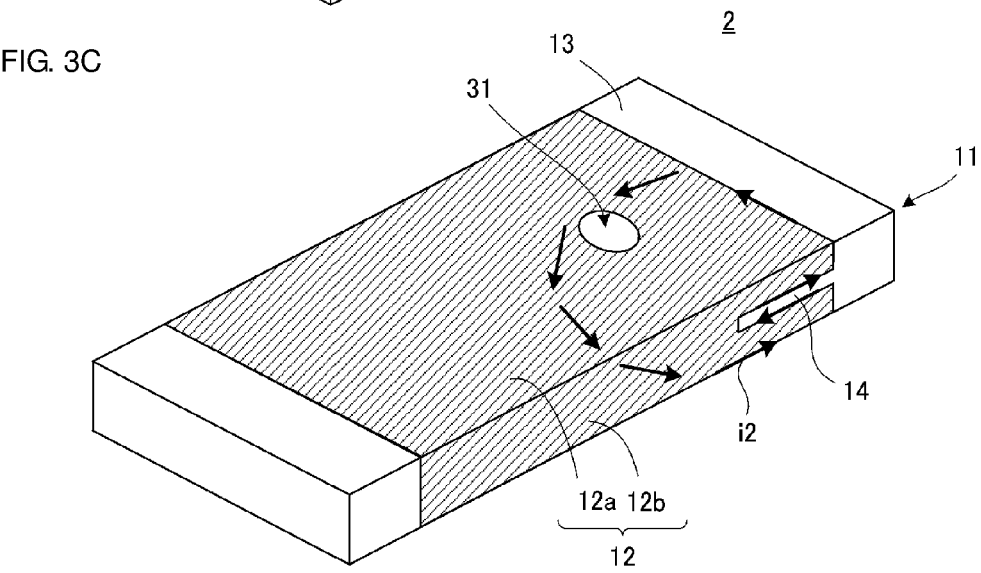
FIG. 3C is a diagram illustrating an induced current flowing through the metal casing portion 12 in a case in which the induced current is small.

FIG. 3A is a diagram illustrating a current flowing through the feed coil 21. FIG. 3B is a diagram illustrating a main induced current flowing through the metal casing portion 12 in a case in which the induced current is large. FIG. 3C is a diagram illustrating a main induced current flowing through the metal casing portion 12 in a case in which the induced current is small.

If a current i1 flows through the feed coil 21, an induced current i2 flows through the metal casing portion 12, which is coupled by the magnetic field, in a direction of cancelling the magnetic field generated by the current i1. If the induced current i2 is large, the induced current i2 flows around the notch portion 14, and flows to circulate around the metal casing portion 12 owing to the edge effect.

The magnetic field generated by the current i1 and the induced current i2 passes through the coil opening portion 22 and the opening portion 15, and circulates to surround the metal casing portion 12. Therefore, the magnetic field widely spreads around the metal casing portion 12. It is thus possible to cause the metal casing portion 12 to function as an antenna.

If the induced current i2 is small, the induced current i2 flows around the notch portion 14, and flows to circulate around a region of the metal casing portion 12 near the notch portion 14. In this case, the communication distance in the direction in which the first main surface of the electronic apparatus 2 is oriented is slightly short as compared with the case in which the induced current i2 is large. However, the induced current i2 flows in the main surface metal portion 12a also in this case. Thus, the communication distance is increased as compared with a case in which the feed coil 21 alone is provided. Further, it is possible to communicate not only with a communication partner located in the direction in which the first side surface is oriented but also with a communication partner located in the direction in which the first main surface is oriented.

Figure 4:
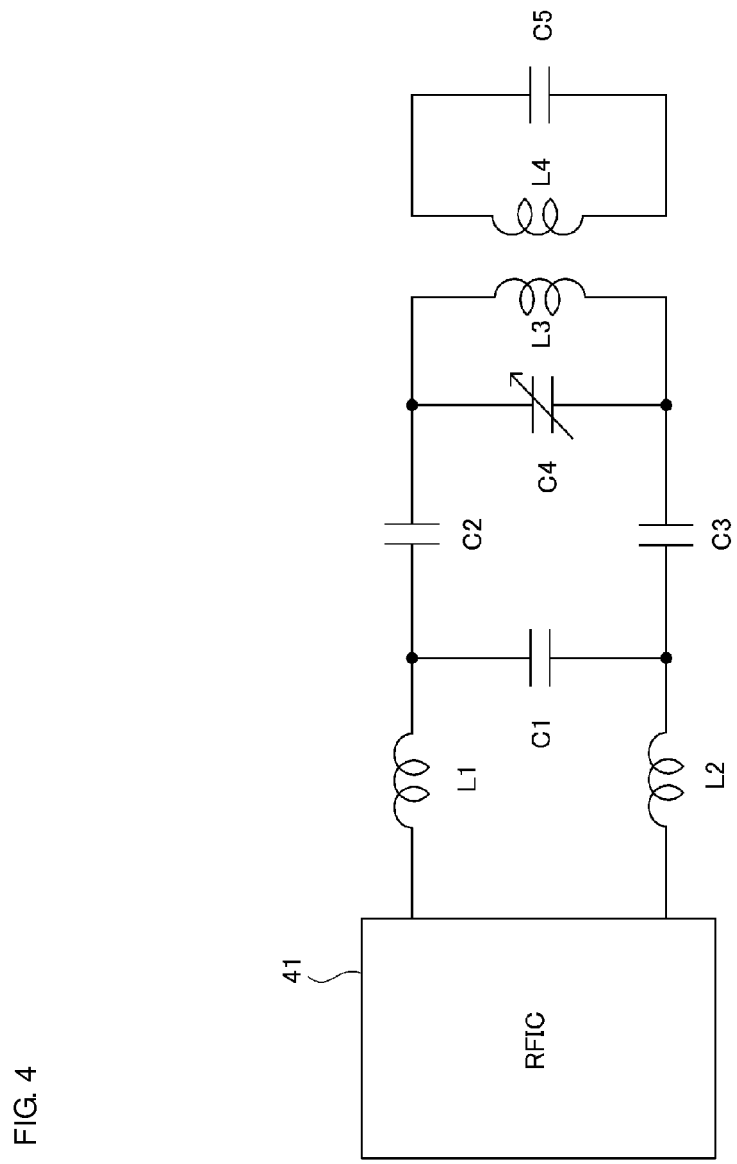
FIG. 4 is a circuit diagram illustrating the antenna device and a feed circuit according to the first preferred embodiment of the present invention.

FIG. 4 is an equivalent circuit diagram illustrating the antenna device 1 and the feed circuit. A first terminal of an RFIC 41 is connected to a first terminal of an inductor L1. A second terminal of the RFIC 41 is connected to a first terminal of an inductor L2. The RFIC 41 is an IC chip configured and programmed to process high-frequency signals.

A second terminal of the inductor L1 is connected to respective first terminals of capacitors C1 and C2. A second terminal of the inductor L2 is connected to a second terminal of the capacitor C1 and a first terminal of a capacitor C3. A second terminal of the capacitor C2 is connected to a first terminal of an inductor L3. A second terminal of the capacitor C3 is connected to a second terminal of the inductor L3. A variable capacitance capacitor C4 is connected in parallel to the inductor L3. The inductor L3 corresponds to the feed coil 21. An inductor L4 and a capacitor C5 correspond to the metal casing portion 12, and are coupled with the inductor L3 by a magnetic field via the inductor L4.

The inductors L1 and L2 and the capacitor C1 define a low pass filter. The low pass filter eliminates harmonic components output from the RFIC 41. The capacitors C2 and C3 define a matching circuit. The matching circuit matches the impedance of the RFIC 41 with the impedance of the feed coil 21 (the inductor L3). The variable capacitance capacitor C4 and the inductor L3 define a parallel resonant circuit. The resonant frequency of the parallel resonant circuit is equal or substantially equal to the carrier wave frequency. The RFIC 41, the inductors L1 and L2, the capacitors C1, C2, and C3, and the variable capacitance capacitor C4 define the feed circuit to supply power to the feed coil 21. These elements are mounted on the circuit board as chip components, but may be integrated as module components, for example.

The inductance of the inductor L4 is mainly determined by the shape, size, and so forth of the opening portion 15 and the slit portion 16 illustrated in FIG. 1B. The capacitance of the capacitor C5 is mainly determined by the shape, size, and so forth of the slit portion 16. With the resonant frequency of a circuit defined by the inductor L4 and the capacitor C5 configured to be equal or substantially equal to the carrier wave frequency, coupling with the antenna of the communication partner by a magnetic field is likely to occur. It is therefore possible to provide favorable communication characteristics.

According to the first preferred embodiment, the feed coil 21 preferably is disposed near the side surface metal portion 12b. Further, the coil opening portion 22 overlaps the opening portion 15, as viewed in the direction perpendicular to the first side surface. When the current flows through the feed coil 21, therefore, the induced current in the direction of cancelling the magnetic field flows through the metal casing portion 12 coupled by the magnetic field. Further, the slit portion 16 connects the opening portion 15 and the outer edge of the side surface metal portion 12b. As a result, the induced current travels around the opening portion 15 and the slit portion 16, and flows around the metal casing portion 12 due to the edge effect. Further, a magnetic field is generated by the current flowing through the feed coil 21 and the induced current flowing through the metal casing portion 12. The magnetic field passes through the coil opening portion 22 and the opening portion 15, and circulates to surround the metal casing portion 12. Therefore, the magnetic field widely spreads around the metal casing portion 12. Accordingly, it is possible to cause the metal casing portion 12 to function as an antenna.

Further, in general, the main surfaces of the electronic apparatus 2 have significant influence on the design of the electronic apparatus 2. The notch portion 14 is preferably provided in the side surface metal portion 12b disposed on a side surface of the electronic apparatus 2. Therefore, there is no need to change the shape and so forth of the main surfaces of the electronic apparatus 2. Accordingly, the degree of design freedom of the electronic apparatus 2 is not limited, and the design is not compromised. Further, providing the notch portion 14 in the side surface metal portion 12*b* does not substantially reduce the strength of the casing 11 of the electronic apparatus 2. It is therefore possible to maintain the strength of the casing 11 of the electronic apparatus 2.

The notch portion 14 may be provided in both the side surface metal portions 12*b* and 12*c*. In this case, a first feed coil is disposed near the side surface metal portion 12*b*, and a second feed coil is disposed near the side surface metal portion 12*c*. The first and second feed coils are connected in parallel or in series to the feed circuit. As a result, the symmetry of the induced current flowing through the main surface metal portion 12*a* is improved, and the directivity of the antenna is oriented in the direction perpendicular to the main surfaces of the casing 11. Communication is also possible in the direction of the two side surfaces.

Further, the coil opening portion 22 may not necessarily be required to overlap the opening portion 15. If the feed coil 21 is disposed near the notch portion 14 with the coil opening portion 22 directed to the region formed with the notch portion 14, a magnetic field spreading around the metal casing portion 12 is generated similarly to the above description.

Figure 5A:
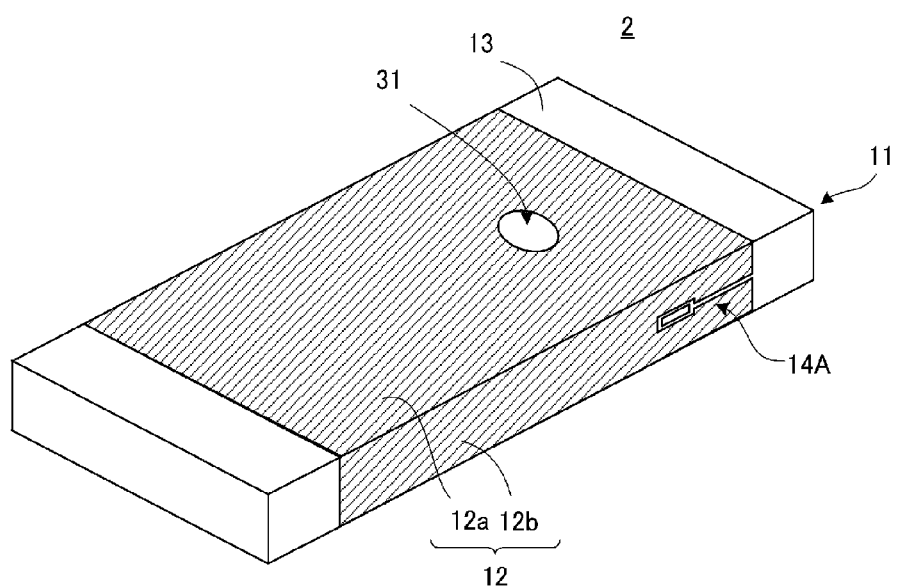
FIG. 5A is an external perspective view of an electronic apparatus including an antenna device according to a second preferred embodiment of the present invention.
Figure 5B:
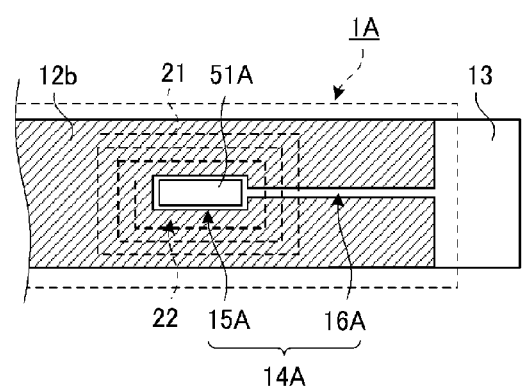
FIG. 5B is a partial side view thereof.

An antenna device according to a second preferred embodiment of the present invention will now be described. FIG. 5A is an external perspective view of an electronic apparatus including the antenna device according to the second preferred embodiment, and FIG. 5B is a partial side view thereof. An antenna device 1A according to the second preferred embodiment includes a notch portion 14A in place of the notch portion 14 according to the first preferred embodiment. Further, the antenna device 1A according to the second preferred embodiment includes a switch unit 51A in addition to the configuration according to the first preferred embodiment. The switch unit 51A corresponds to an operation unit. The other configurations preferably are similar to those of the first preferred embodiment. In the following, differences from the first preferred embodiment will be described.

The notch portion 14A preferably includes an opening portion 15A and a slit portion 16A. The width of the opening portion 15A is greater than the width of the slit portion 16A. The switch unit 51A is disposed in the opening portion 15A. The switch unit 51A is, for example, a camera switch (shutter button), a main power switch, or a volume control switch. An interface unit may be disposed in the opening portion 15A. The interface unit is, for example, an IC terminal for HDMI (registered trademark), an earphone jack terminal, or an insertion slot for an SD card.

According to the second preferred embodiment, it is possible to use the metal casing portion 12 as an antenna while maintaining the strength of the casing 11 without limiting the degree of design freedom of the electronic apparatus 2. It is also possible to effectively use the space in the opening portion 15A.

Figure 6A:
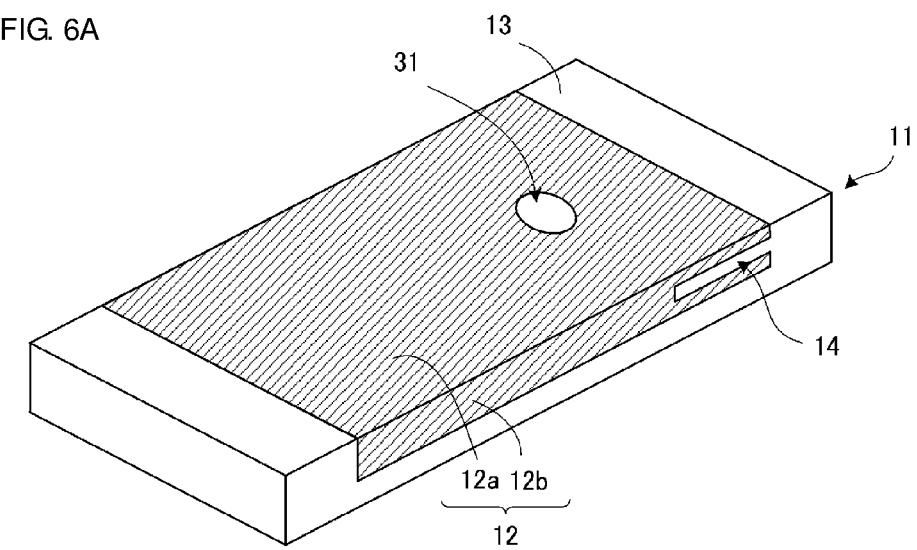
FIG. 6A is an external perspective view of an electronic apparatus including an antenna device according to a third preferred embodiment of the present invention.
Figure 6B:
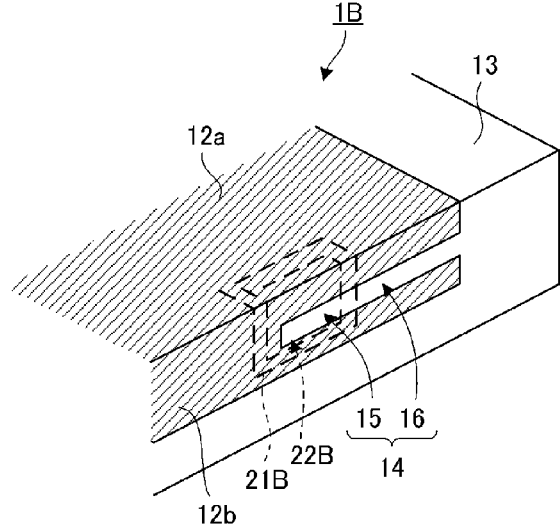
FIG. 6B is a partial enlarged view thereof.

An antenna device according to a third preferred embodiment of the present invention will now be described. FIG. 6A is an external perspective view of an electronic apparatus including the antenna device according to the third preferred embodiment, and FIG. 6B is a partial enlarged view thereof. An antenna device 1B according to the third preferred embodiment includes a feed coil 21B in place of the feed coil 21 according to the first preferred embodiment. The other configurations preferably are similar to those of the first preferred embodiment. In the following, differences from the first preferred embodiment will be described.

A portion of the feed coil 21B is disposed near the side surface metal portion 12*b*. The other portion of the feed coil 21B is disposed near the main surface metal portion 12*a*. A coil opening portion 22B overlaps the opening portion 15, as viewed in the direction perpendicular to the first side surface of the electronic apparatus 2.

According to the third preferred embodiment, a portion of the feed coil 21B is disposed near the main surface metal portion 12*a*. Even if the high-frequency power supplied to the feed coil 21B is small, therefore, the induced current generated in the metal casing portion 12 spreads to a region of the main surface metal portion 12*a* distant from the notch portion 14. Further, the magnetic field generated around the metal casing portion 12 widely spreads in the direction in which the first main surface of the electronic apparatus 2 is oriented. Even if the high-frequency power is small, therefore, it is possible to increase the communication distance of the antenna device 1B not only in the direction in which the first side surface of the electronic apparatus 2 is oriented but also in the direction in which the first main surface of the electronic apparatus 2 is oriented. Further, the degree of design freedom of the electronic apparatus 2 is not limited similarly to the first preferred embodiment. It is also possible to maintain the strength of the casing 11.

Figure 7A:
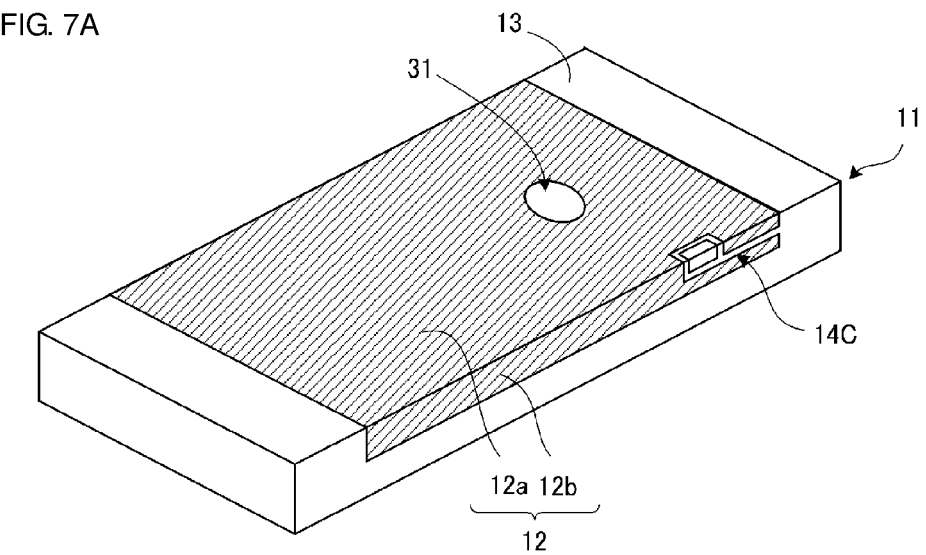
FIG. 7A is an external perspective view of an electronic apparatus including an antenna device according to a fourth preferred embodiment of the present invention.
Figure 7B:
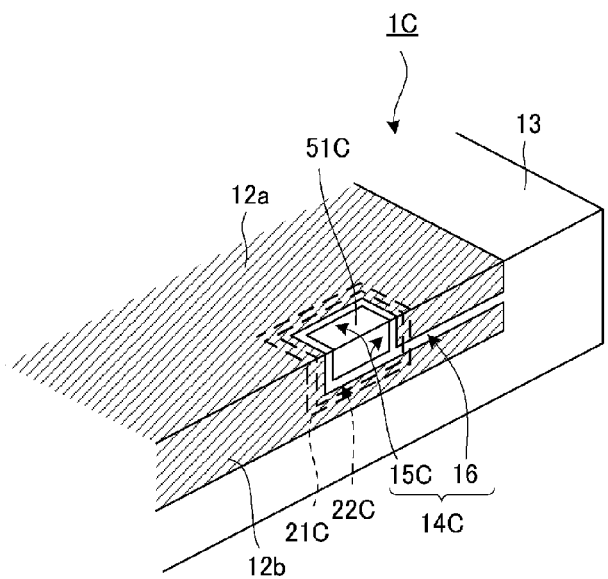
FIG. 7B is a partial enlarged view thereof.

An antenna device according to a fourth preferred embodiment of the present invention will now be described. FIG. 7A is an external perspective view of an electronic apparatus including the antenna device according to the fourth preferred embodiment, and FIG. 7B is a partial enlarged view thereof. An antenna device 1C according to the fourth preferred embodiment includes a feed coil 21C in place of the feed coil 21 according to the first preferred embodiment. Further, the antenna device 1C according to the fourth preferred embodiment includes a notch portion 14C in place of the notch portion 14 according to the first preferred embodiment. Further, the antenna device 1C according to the fourth preferred embodiment includes a switch unit 51C in addition to the configuration according to the first preferred embodiment. The switch unit 51C corresponds to the operation unit. The other configurations preferably are similar to those of the first preferred embodiment. In the following, differences from the first preferred embodiment will be described.

The notch portion 14C preferably includes an opening portion 15C and the slit portion 16. The opening portion 15C is preferably provided in the side surface metal portion 12*b* and extends to the main surface metal portion 12*a*. A portion of the feed coil 21C is disposed near the side surface metal portion 12*b*. The other portion of the feed coil 21C is disposed near the main surface metal portion 12*a*. A portion of a coil opening portion 22C overlaps a part of the opening portion 15C, as viewed in the direction perpendicular to the first side surface of the electronic apparatus 2. The other portion of the coil opening portion 22C overlaps the other portion of the opening portion 15C, as viewed in the direction perpendicular to the first main surface. The switch unit 51C is disposed in the opening portion 15C. The switch unit 51C may be replaced by an interface unit.

According to the fourth preferred embodiment, a portion of the feed coil 21C is disposed near the main surface metal portion 12*a*. Further, a portion of the opening portion 15C and a portion of the coil opening portion 22C are preferably provided in the main surface metal portion 12*a*. As a result, the magnetic field generated around the metal casing portion 12 widely spreads in the direction in which the first main surface of the electronic apparatus 2 is oriented. Even if the high-frequency power supplied to the feed coil 21C is small, therefore, it is possible to increase the communication distance of the antenna device 1C not only in the direction in which the first side surface of the electronic apparatus 2 is oriented but also in the direction in which the first main surface of the electronic apparatus 2 is oriented. Further, the degree of design freedom of the electronic apparatus 2 is not limited similarly to the first preferred embodiment. It is also possible to maintain the strength of the casing 11.

Figure 8A:
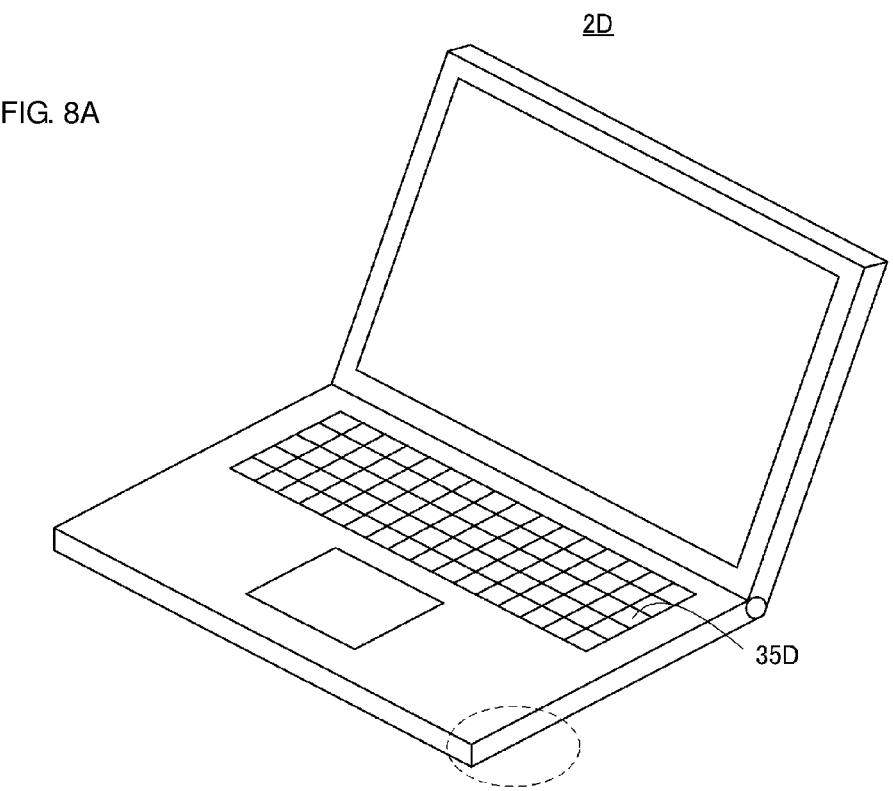
FIG. 8A is an external perspective view of an electronic apparatus including an antenna device according to a fifth preferred embodiment of the present invention.
Figure 8B:
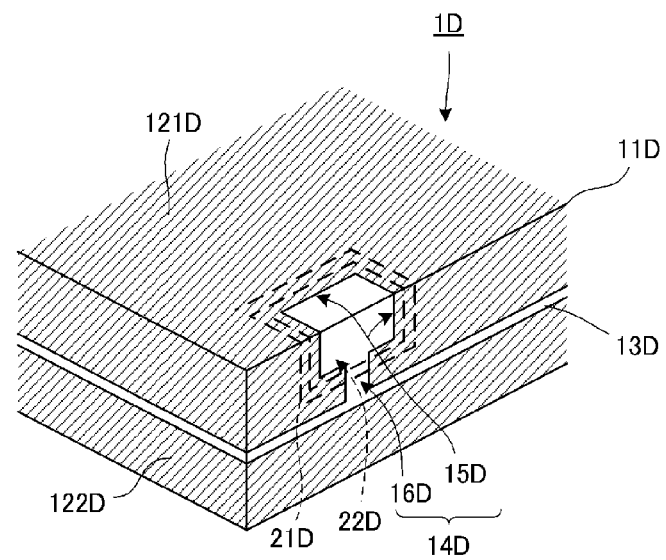
FIG. 8B is a partial enlarged view thereof.

An antenna device according to a fifth preferred embodiment of the present invention will now be described. FIG. 8A is an external perspective view of an electronic apparatus including the antenna device according to the fifth preferred embodiment, and FIG. 8B is a partial enlarged view thereof. In the following, differences from the first preferred embodiment will be described.

An antenna device 1D preferably is disposed on a side surface of a notebook PC 2D. The notebook PC 2D corresponds to an electronic apparatus. The electronic apparatus according to various preferred embodiments of the present invention may be a variety of electronic apparatuses such as a tablet terminal.

A casing 11D preferably includes metal casing portions 121D and 122D and a resin casing portion 13D. The metal casing portion 121D is disposed on a first main surface of the notebook PC 2D (a surface on which a keyboard 35D is disposed). The metal casing portion 122D is disposed on a second main surface thereof (a surface opposite to the first main surface). The metal casing portions 121D and 122D extend to side surfaces connecting the first and second main surfaces, and are disposed on the side surfaces via the resin casing portion 13D.

A notch portion 14D preferably includes an opening portion 15D and a slit portion 16D on the metal casing portion 121D. The opening portion 15D is preferably provided in a side surface and extends to the first main surface. The slit portion 16D is preferably provided in the side surface and connects the opening portion 15D and an outer edge of the metal casing portion 121D.

A portion of the feed coil 21D is disposed near the metal casing portion 121D disposed on the side surface. The other portion of the feed coil 21D is disposed near the metal casing portion 121D disposed on the first main surface. A portion of a coil opening portion 22D overlaps a portion of the opening portion 15D, as viewed in the direction perpendicular to the side surface. The other portion of the coil opening portion 22D overlaps the other portion of the opening portion 15D, as viewed in the direction perpendicular to the first main surface.

According to the fifth preferred embodiment, it is possible to use the metal casing portion 121D as an antenna while maintaining the strength of the casing 11D without limiting the degree of design freedom of the notebook PC 2D.

Figure 9A:
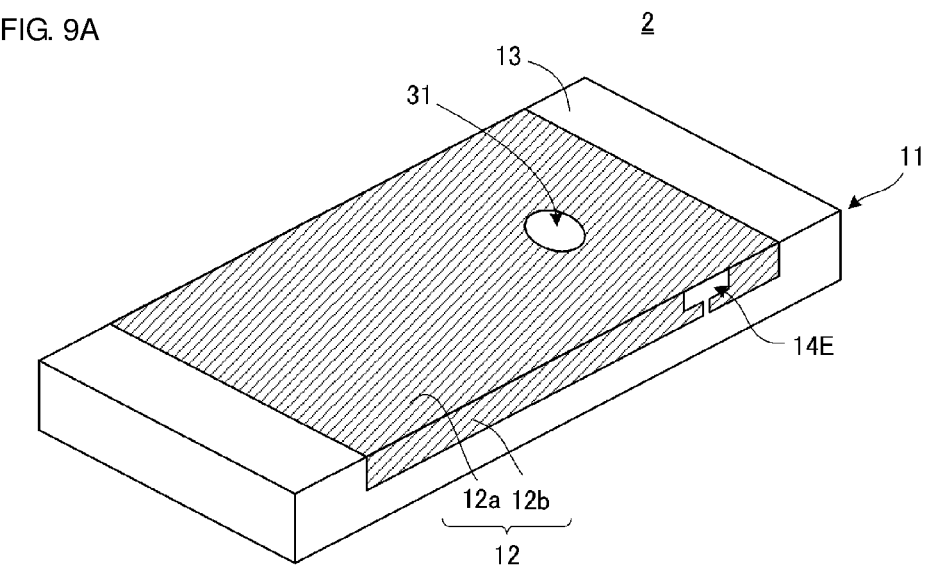
FIG. 9A is an external perspective view of an electronic apparatus including an antenna device according to a sixth preferred embodiment.
Figure 9B:
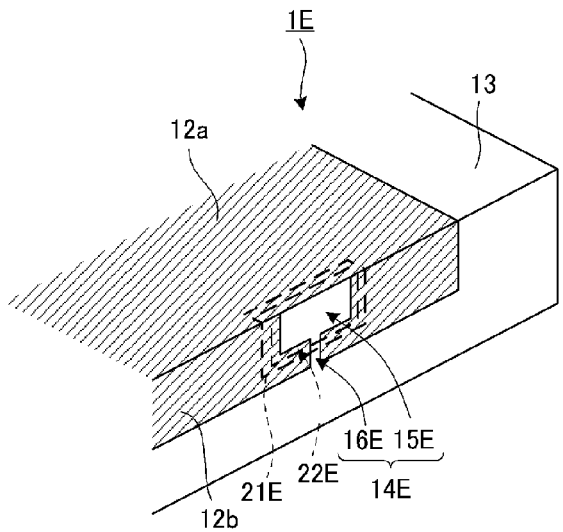
FIG. 9B is a partial enlarged view thereof.

An antenna device according to a sixth preferred embodiment of the present invention will now be described. FIG. 9A is an external perspective view of an electronic apparatus including the antenna device according to the sixth preferred embodiment, and FIG. 9B is a partial enlarged view thereof. An antenna device 1E according to the sixth preferred embodiment includes a notch portion 14E in place of the notch portion 14 according to the first preferred embodiment. Further, the antenna device 1E according to the sixth preferred embodiment includes a feed coil 21E in place of the feed coil 21 according to the first preferred embodiment. The other configurations preferably are similar to those of the first preferred embodiment. In the following, differences from the first preferred embodiment will be described.

The notch portion 14E preferably includes an opening portion 15E and a slit portion 16E. The opening portion 15E is preferably provided in the side surface metal portion 12b, and is in contact with the boundary between the main surface metal portion 12a and the side surface metal portion 12b. The slit portion 16E connects the opening portion 15E and an outer edge of the side surface metal portion 12b. The outer edge is a side of the outer edges of the side surface metal portion 12b parallel to the first main surface of the electronic apparatus 2.

A portion of the feed coil 21E is disposed near the side surface metal portion 12b. The other portion of the feed coil 21E is disposed near the main surface metal portion 12a. A coil opening portion 22E overlaps the opening portion 15E, as viewed in the direction perpendicular to the first side surface.

According to the sixth preferred embodiment, it is possible to use the metal casing portion 12 as an antenna while maintaining the strength of the casing 11 without limiting the degree of design freedom of the electronic apparatus 2.

Figure 10A:
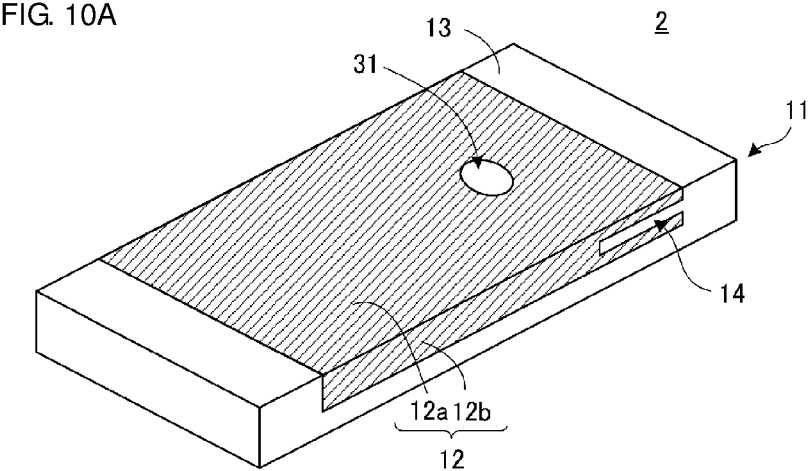
FIG. 10A is an external perspective view of an electronic apparatus including an antenna device according to a seventh preferred embodiment of the present invention.
Figure 10B:
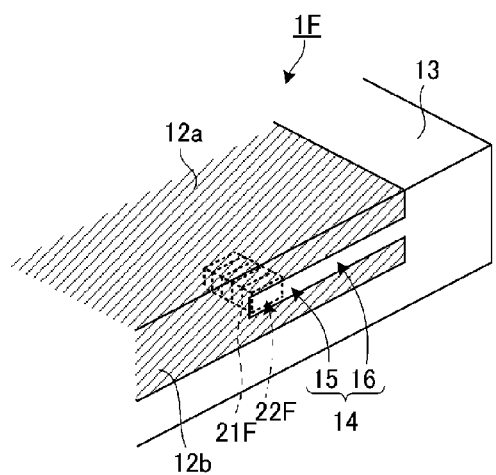
FIGS. 10B and 10C are partial enlarged views thereof.

An antenna device according to a seventh preferred embodiment of the present invention will now be described. FIG. 10A is an external perspective view of an electronic apparatus including the antenna device according to the seventh preferred embodiment, and FIG. 10B is a partial enlarged view thereof. An antenna device 1F according to the seventh preferred embodiment includes a feed coil 21F in place of the feed coil 21 according to the first preferred embodiment. The other configurations preferably are similar to those of the first preferred embodiment. In the following, differences from the first preferred embodiment will be described.

The feed coil 21F preferably includes a chip coil including a coil conductor arranged around a magnetic material. A coil opening portion 22F overlaps the opening portion 15, as viewed in the direction perpendicular to the first side surface. The feed coil 21F is mounted on the not-illustrated circuit board together with the feed circuit.

Figure 10C:
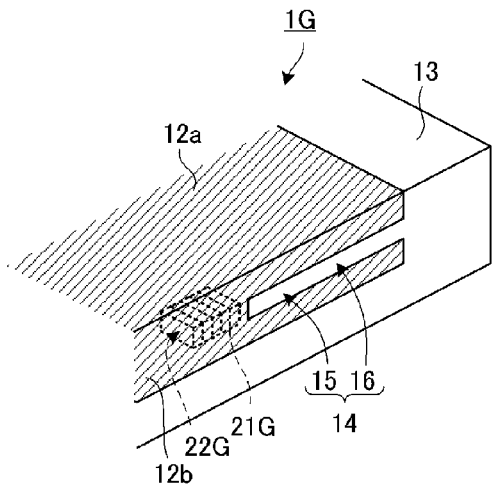

Further, the feed coil defined by a chip coil may be disposed as in FIG. 10C. An antenna device 1G includes a feed coil 21G defined by a chip coil. An opening surface of a coil opening portion 22G is disposed to be perpendicular or substantially perpendicular to a main surface of the side surface metal portion 12b. The feed coil 21G is disposed near the notch portion 14 with the coil opening portion 22G directed to the region formed with the notch portion 14. As a result, a magnetic field is generated to pass through the coil opening portion 22G and the opening portion 15. Therefore, the feed coil 21G is coupled with the metal casing portion 12 by the magnetic field.

According to the seventh preferred embodiment, it is possible to use the metal casing portion 12 as an antenna while maintaining the strength of the casing 11 without limiting the degree of design freedom of the electronic apparatus 2.

Figure 11A:
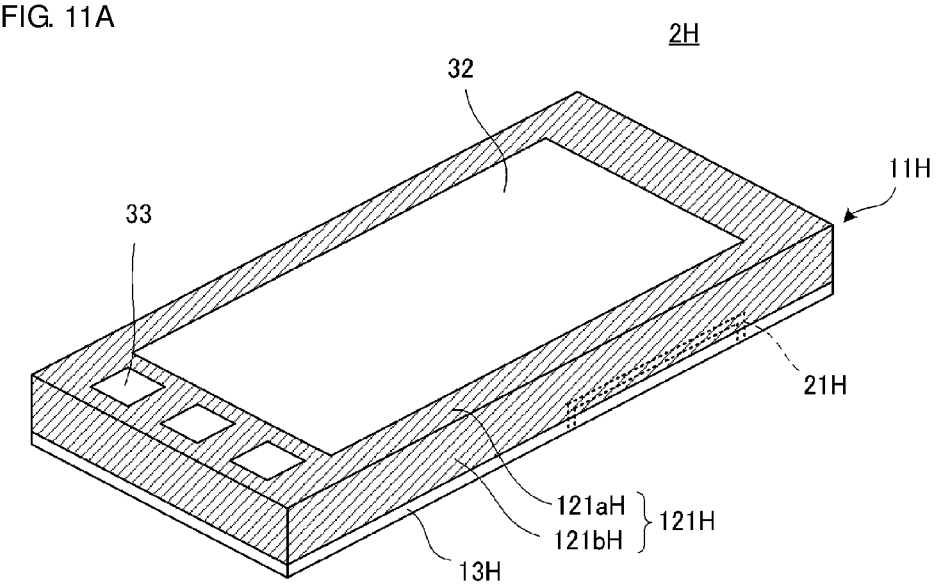
FIG. 11A is an external perspective view of an electronic apparatus including an antenna device according to an eighth preferred embodiment of the present invention, as viewed from a front surface (operation surface) side thereof.
Figure 11B:
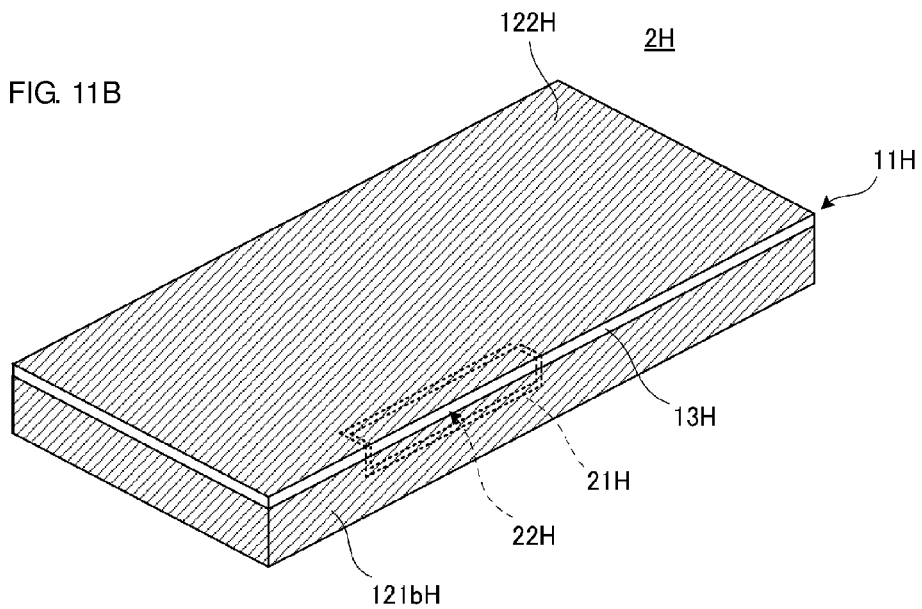
FIG. 11B is an external perspective view of the electronic apparatus, as viewed from a rear surface side thereof.
Figure 12:
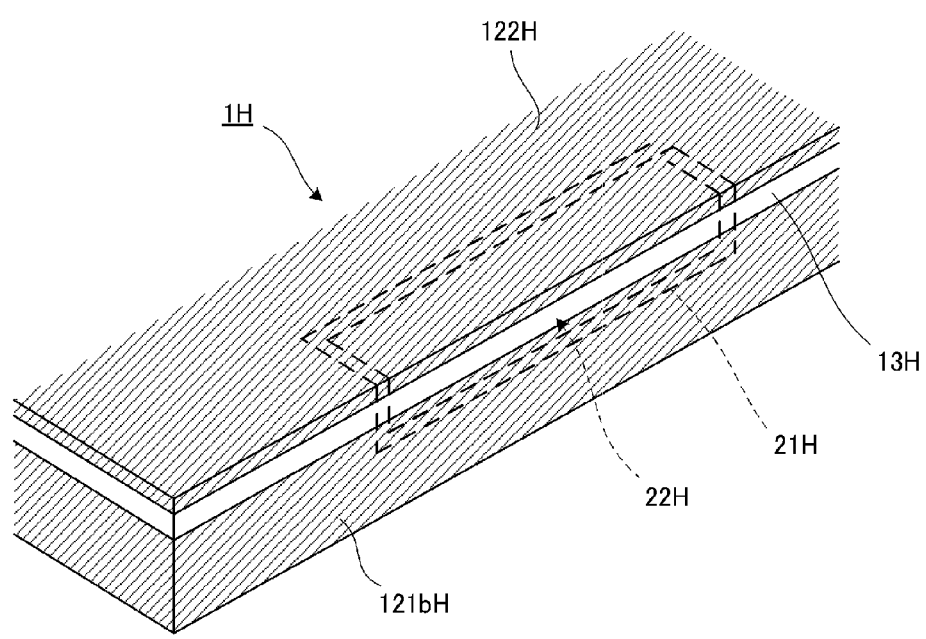
FIG. 12 is a partial enlarged view of the electronic apparatus including the antenna device according to the eighth preferred embodiment of the present invention, as viewed from the rear surface side thereof.

An antenna device according to an eighth preferred embodiment of the present invention will now be described. FIG. 11A is an external perspective view of an electronic apparatus including the antenna device according to the eighth preferred embodiment, as viewed from a front surface (operation surface) side thereof, and FIG. 11B is an external perspective view of the electronic apparatus, as viewed from a rear surface side thereof. FIG. 12 is a partial enlarged view of the electronic apparatus, as viewed from the rear surface side thereof. In the following, differences from the first preferred embodiment will be described.

An antenna device 1H includes a metal casing portion (upper casing) 121H, a metal casing portion (lower casing) 122H, and a feed coil 21H. The metal casing portion 121H preferably includes a front surface metal portion 121aH and a side surface metal portion 121bH.

The front surface metal portion 121aH preferably has a flat or substantially flat plate shape, and defines a front surface of a casing 11H of an electronic apparatus 2H. The front surface metal portion 121aH preferably includes opening portions, in which the display unit 32 and the operation unit 33 are disposed. The side surface metal portion 121bH preferably has a frame shape, and is disposed to cover most of side surfaces of the casing 11H. The front surface metal portion 121aH and the side surface metal portion 121bH are connected to define the box-shaped metal casing portion 121H. The metal casing portion 122H preferably has a flat plate shape, and forms a rear surface of the casing 11H. A gap between the metal casing portion 121H and the metal casing portion 122H is occupied by a frame-shaped resin casing portion (gap portion) 13H.

The feed coil 21H is disposed inside the casing 11H along the side surface metal portion 121bH and the metal casing portion 122H. A coil opening portion 22H of the feed coil 21H overlaps the resin casing portion 13H, as viewed in the direction perpendicular to a side surface of the casing 11H having the feed coil 21H disposed thereon. The outer dimension of the feed coil 21H is long in the long direction of the casing 11H and short in the short direction of the casing 11H.

The metal casing portion 121H and the metal casing portion 122H may be connected at predetermined locations. If the metal casing portion 121H and the metal casing portion 122H are connected with connection conductors, however, providing two connection conductors near both sides of the feed coil 21H is avoided. This is because shortcut of the induced current may occur in the metal casing portions 121H and 122H, and the induced current may flow only in portions of the metal casing portions 121H and 122H near the feed coil 21H.

According to the eighth preferred embodiment, the resin casing portion 13H is disposed offset to be closer to the rear surface of the casing 11H, and the feed coil 21H is disposed along a side surface and the rear surface of the casing 11H. Therefore, the antenna device 1H has directivity in the direction of the rear surface of the electronic apparatus 2H.

Further, as described above, the outer dimension of the feed coil 21H is long in the long direction of the casing 11H and short in the short direction of the casing 11H. That is, the feed coil 21H is configured and disposed such that the overlapping area of the coil opening portion 22H of the feed coil 21H and the resin casing portion 13H is increased as much as possible. As a result, the coupling of the metal casing portions 121H and 122H and the feed coil 21H by the magnetic field is reinforced. Accordingly, the radiation efficiency of the antenna device 1H is increased.

According to the configuration of the eighth preferred embodiment, it is possible to use the metal casing portions 121H and 122H as an antenna while maintaining the strength of the casing 11H without limiting the degree of design freedom of the electronic apparatus 2H.

Figure 13A:
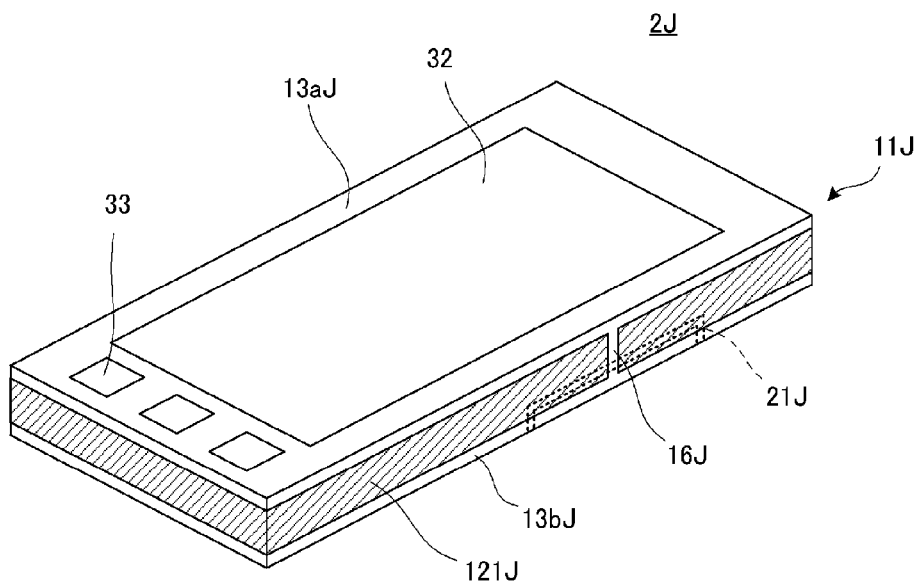
FIG. 13A is an external perspective view of an electronic apparatus including an antenna device according to a ninth preferred embodiment of the present invention, as viewed from a front surface (operation surface) side thereof.
Figure 13B:
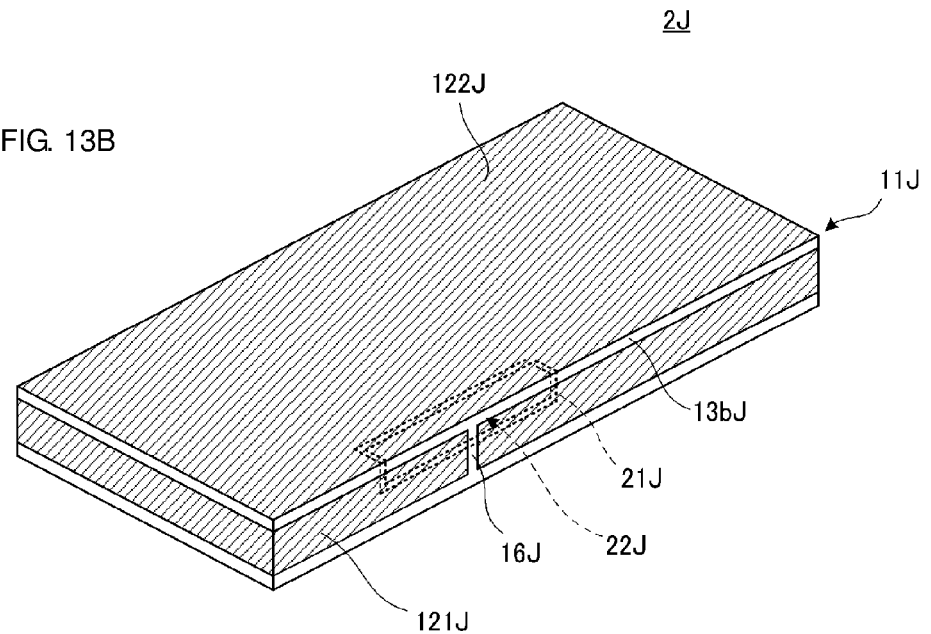
FIG. 13B is an external perspective view of the electronic apparatus, as viewed from a rear surface side thereof.
Figure 14:
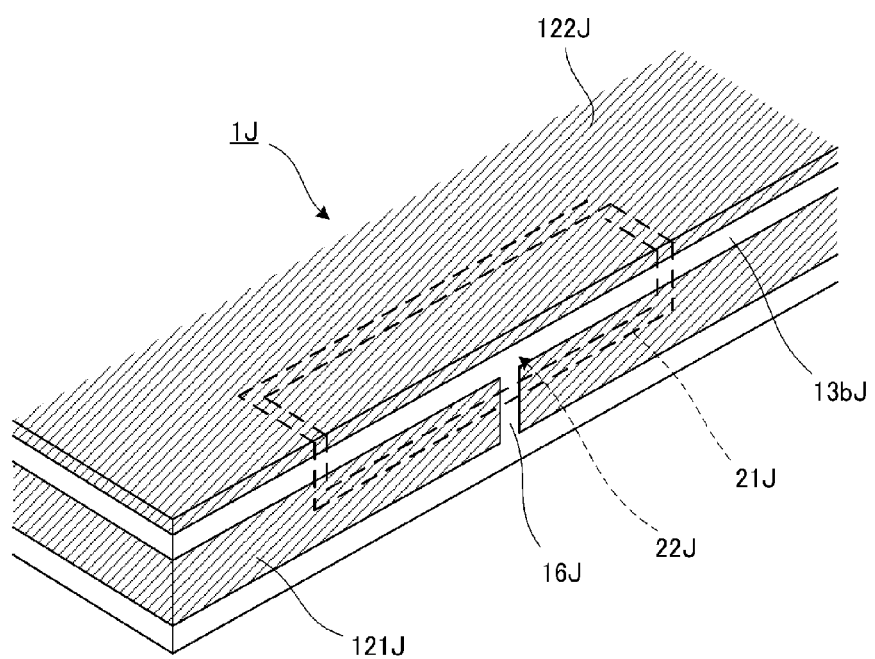
FIG. 14 is a partial enlarged view of the electronic apparatus including the antenna device according to the ninth preferred embodiment of the present invention, as viewed from the rear surface side thereof.

An antenna device according to a ninth preferred embodiment of the present invention will now be described. FIG. 13A is an external perspective view of an electronic apparatus including the antenna device according to the ninth preferred embodiment, as viewed from a front surface (operation surface) side thereof, and FIG. 13B is an external perspective view of the electronic apparatus, as viewed from a rear surface side thereof. FIG. 14 is a partial enlarged view of the electronic apparatus, as viewed from the rear surface side thereof. In the following, differences from the first preferred embodiment will be described.

An antenna device 1J includes a metal casing portion (frame-shaped casing) 121J, a metal casing portion (lower casing) 122J, and a feed coil 21J. The metal casing portion 121J preferably has a frame or substantially frame shape, and is disposed to cover most of side surfaces of a casing 11J of an electronic apparatus 2J. A slit portion (gap portion) 16J made of a resin is configured to connect one end surface and the other end surface of the metal casing portion 121J. The slit portion (gap portion) 16J extends in the thickness direction (vertical direction) of the casing 11J. The metal casing portion 122J preferably has a flat plate shape, and defines a rear surface of the casing 11J. A gap between the metal casing portion 121J and the metal casing portion 122J is occupied by a frame-shaped resin casing portion (gap portion) 13bJ. The other portion of the casing 11J including the front surface thereof is occupied by a resin casing portion (upper casing) 13aJ. The slit portion 16J may be provided in another portion of the metal casing portion 121J. That is, the slit portion 16J may be provided not in a portion of the metal casing portion 121J corresponding to the long direction of the casing 11J but in a portion of the metal casing portion 121J corresponding to the short direction of the casing 11J.

The feed coil 21J is disposed inside the casing 11J along the metal casing portion 121J and the metal casing portion 122J. A coil opening portion 22J of the feed coil 21J overlaps a portion in which the slit portion (gap portion) 16J and the resin casing portion (gap portion) 13bJ are connected, as viewed in the direction perpendicular to a side surface of the casing 11J including the feed coil 21J disposed thereon. The outer dimension of the feed coil 21J is long in the long direction of the casing 11J and short in the short direction of the casing 11J.

The metal casing portion 121J and the metal casing portion 122J may be connected at predetermined locations. If the metal casing portion 121J and the metal casing portion 122J are connected with connection conductors, two connection conductors are preferably provided near both sides of the feed coil 21J. Further, the resin casing portion (gap portion) 13bJ, which is disposed around the entire circumference of the casing 11J, is not necessary required to be provided around the entire circumference. For example, the slit portion (gap portion) 16J and the resin casing portion (gap portion) 13bJ may define a T-shaped slit.

According to the ninth preferred embodiment, the slit portion 16J is provided in the metal casing portion 121J. Similarly to the first preferred embodiment, therefore, an induced current flows around the metal casing portion 121J, 122J, and a magnetic field widely spreads around the metal casing portions 121J and 122J. As a result, the radiation efficiency of the antenna device 1J is increased, and it is possible to increase the communication distance of the antenna device 1J.

Further, effects similar to those of the eighth preferred embodiment are also obtainable by the ninth preferred embodiment.

Figure 15A:
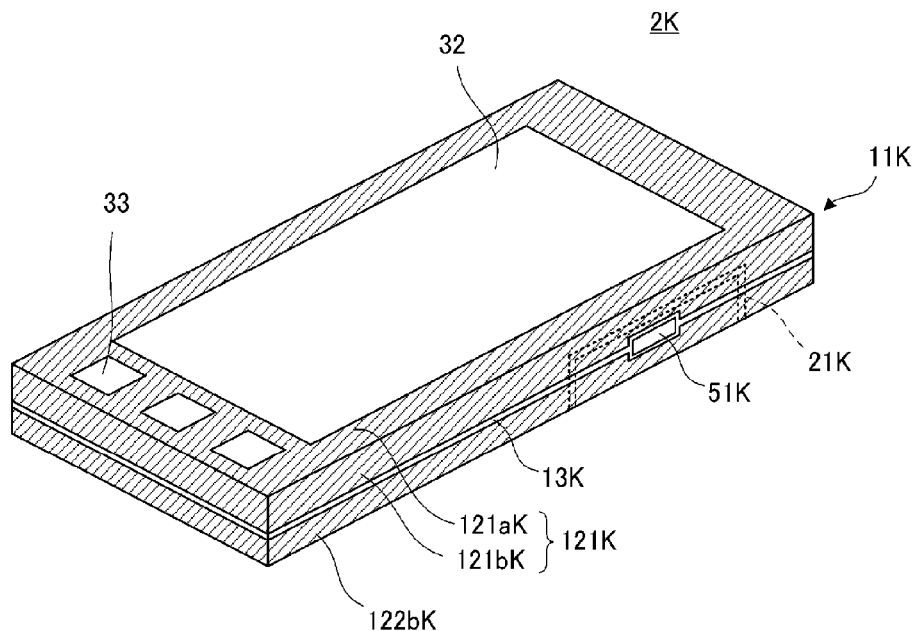
FIG. 15A is an external perspective view of an electronic apparatus including an antenna device according to a tenth preferred embodiment of the present invention, as viewed from a front surface (operation surface) side thereof.
Figure 15B:
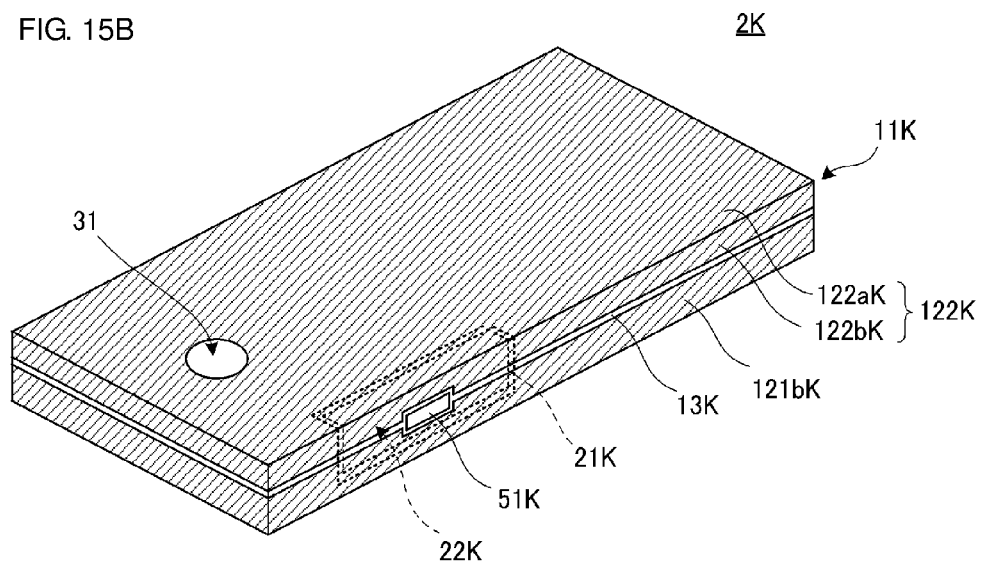
FIG. 15B is an external perspective view of the electronic apparatus, as viewed from a rear surface side thereof.
Figure 16:
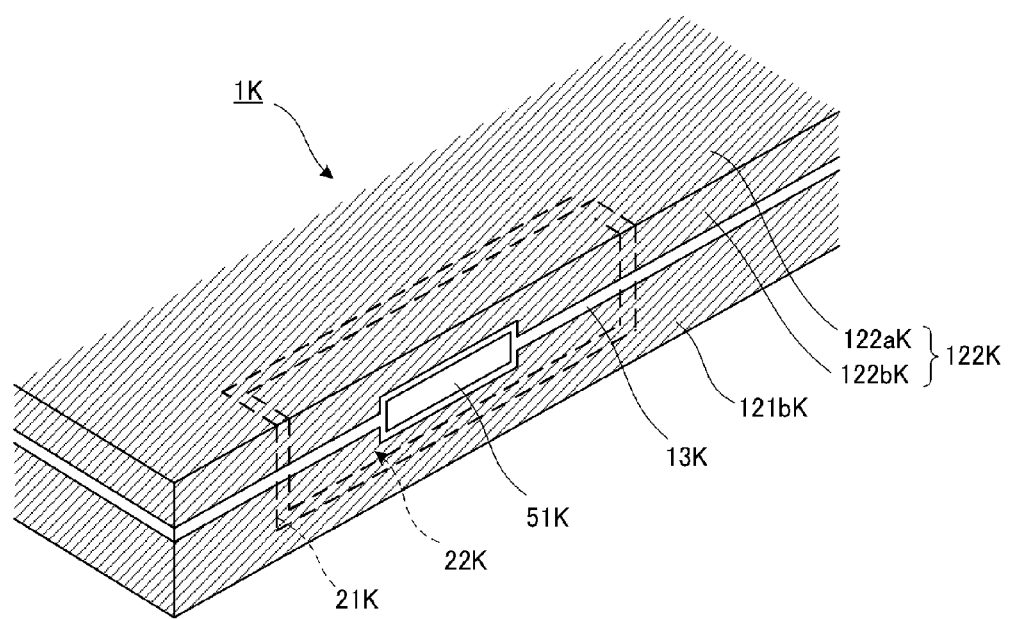
FIG. 16 is a partial enlarged view of the electronic apparatus including the antenna device according to the tenth preferred embodiment of the present invention, as viewed from the rear surface side thereof.

An antenna device according to a tenth preferred embodiment of the present invention will now be described. FIG. 15A is an external perspective view of an electronic apparatus including the antenna device according to the tenth preferred embodiment, as viewed from a front surface (operation surface) side thereof, and FIG. 15B is an external perspective view of the electronic apparatus, as viewed from a rear surface side thereof. FIG. 16 is a partial enlarged view of the electronic apparatus, as viewed from the rear surface side thereof. In the following, differences from the first preferred embodiment will be described.

An antenna device 1K includes a metal casing portion (upper casing) 121K, a metal casing portion (lower casing) 122K, and a feed coil 21K. The metal casing portion 121K includes a front surface metal portion 121aK and a side surface metal portion 121bK. The metal casing portion 122K includes a rear surface metal portion 122aK and a side surface metal portion 122bK.

The front surface metal portion 121aK preferably has a flat or substantially flat plate shape, and defines a front surface of a casing 11K of an electronic apparatus 2K. The front surface metal portion 121aK preferably includes opening portions, in which the display unit 32 and the operation unit 33 are disposed. The side surface metal portion 121bK has a frame shape, and is disposed on side surfaces of the casing 11K to be closer to the front surface. The front surface metal portion 121aK and the side surface metal portion 121bK are connected to define the box-shaped metal casing portion 121K.

The rear surface metal portion 122aK preferably has a flat or substantially flat plate shape, and defines a rear surface of the casing 11K. The rear surface metal portion 121aK is provided with an opening 31 at the position of a camera lens. The side surface metal portion 122bK has a frame shape, and is disposed on the side surfaces of the casing 11K to be closer to the rear surface. The rear surface metal portion 122aK and the side surface metal portion 122bK are connected to define the box-shaped metal casing portion 122K.

A gap between the metal casing portion 121K and the metal casing portion 122K is occupied by a frame-shaped or substantially frame-shaped resin casing portion (gap portion) 13K. The resin casing portion 13K is disposed to be closer to the rear surface. The resin casing portion 13K preferably includes an opening portion, in which a switch unit 51K is disposed. As described above, the switch unit 51K is, for example, a terminal main power ON/OFF switch, a volume control switch, or a shutter button of a camera.

The feed coil 21K is disposed inside the casing 11K along the side surface metal portion 121bK and the metal casing portion 122K. A coil opening portion 22K of the feed coil 21K overlaps the resin casing portion 13K, as viewed in the direction perpendicular to a side surface of the casing 11K having the feed coil 21K disposed thereon. The outer dimension of the feed coil 21K is long in the long direction of the casing 11K and short in the short direction of the casing 11K. The resin casing portion 13K is disposed offset to be closer to the rear surface of the casing 11K, and the feed coil 21K is disposed along the side surface and the rear surface of the casing 11K.

The metal casing portion 121K and the metal casing portion 122K preferably are connected at predetermined locations. If the metal casing portion 121K and the metal casing portion 122K are connected with connection conductors, however, providing two connection conductors near both sides of the feed coil 21K is avoided.

According to the tenth preferred embodiment, it is possible to obtain effects similar to those of the eighth preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic apparatus comprising:
   a casing including a first metal casing portion and a second metal casing portion; and
   a feed coil disposed inside the casing, and including a winding central portion defining a coil opening portion; wherein
   the first metal casing portion and the second metal casing portion are not continuous with each other and are separated by a slit located on a first surface of the casing; and
   when the first surface is viewed in plan view, the feed coil overlaps both of the first metal casing portion and the second metal casing portion.

2. The electronic apparatus according to claim 1, wherein the first metal casing portion and the second metal casing portion are not galvanically connected.

3. The electronic apparatus according to claim 1, wherein the feed coil has a longer side direction and a shorter side direction; and
   the longer side direction is substantially parallel to a direction in which the slit extends.

4. The electronic apparatus according to claim 1, wherein the slit is filled with a plastic casing portion.

* * * * *